United States Patent
Borom et al.

[11] 3,759,108
[45]*Sept. 18, 1973

[54] SINGLE GAUGE MULTI-TIME CONSTANT AND MULTI-TISSUE RATIO AUTOMATIC DECOMPRESSION INSTRUMENTS

[75] Inventors: Marcus P. Borom; Lyman A. Johnson, both of Schenectady, N.Y.

[73] Assignee: General Electric Company, Schenectady, N.Y.

[ * ] Notice: The portion of the term of this patent subsequent to Jan. 16, 1990, has been disclaimed.

[22] Filed: Sept. 16, 1971

[21] Appl. No.: 181,099

[52] U.S. Cl. .................................. 73/432, 235/184
[51] Int. Cl. ........................................... G06g 5/00
[58] Field of Search .................... 73/299, 300, 395, 73/396, 406 R, 407 R, 412, 432; 235/184

[56] References Cited
UNITED STATES PATENTS

3,208,284  9/1965  Rivero .................................. 73/395
3,121,333  2/1964  Alinari ................................. 73/299

FOREIGN PATENTS OR APPLICATIONS

522,272  0/1955  Italy ..................................... 73/395
735,170  5/1966  Canada Primary Examiner—S. Clement Swisher
Attorney—John F. Ahern et al.

[57] ABSTRACT

These instruments for guiding a diver's rapid, safe return to the surface have in each instance a single gauge which through an automatic switching feature serves a number of different time-constant gas chambers of the pneumatic analogue computing means and indicates the maximum gas pressure prevailing in the gas chamber array. The instrument also includes a tissue-ratio compensating feature in the form of springs of different appropriate constants situated in the gas chambers.

7 Claims, 2 Drawing Figures

Patented Sept. 18, 1973

3,759,108

Inventors:
Marcus P. Borom,
Lyman A. Johnson,
by Their Attorney.

SINGLE GAUGE MULTI-TIME CONSTANT AND MULTI-TISSUE RATIO AUTOMATIC DECOMPRESSION INSTRUMENTS

The present invention relates generally to the art of computing decompression schedules and is more particularly concerned with a novel pneumatic analogue decompression instrument which continuously senses ambient pressures experienced during hyperbaric exposure and computes and indicates a minimum-duration safe decompression schedule.

CROSS REFERENCES

This invention is related to those of the following four patent applications assigned to the assignee hereof and filed of even date herewith:

Patent Application Ser. No. 181,048, filed Sept. 16, 1971, entitled, "Pneumatic Analogue Decompression Instrument," in the name of Marcus P. Borom, which discloses and claims the concept of using a permselective membrane to simulate the gas-diffusion characteristics of body tissues as they take up the gas of the breathing mixture and release it as ambient pressure varies.

Patent Application Ser. No. 181,107, filed Sept. 16, 1971, entitled, "Multi-Time Constant Pneumatic Analogue Decompression Instruments," in the names of Lyman A. Johnson and Marcus P. Borom, which discloses and claims the concept of matching different time-constants of various body tissues with membrane chambers of different diffusion controlled time-constant characteristics to provide a versatile decompression meter.

Patent Application Ser. No. 181,096, filed Sept. 16, 1971, entitled, "Combined Depth Gauge and Pneumatic Analogue Decompression Instrument," in the names of Marcus P. Borom and Lyman A. Johnson, which discloses and claims the concept of using a porous body both to provide the volume of the time-constant gas chamber and to provide support for the semipermeable membrane and the gauge-sealing diaphragm. An additional novel feature is the coordinated depth gauge formed in the transparent cover of the instrument for read-out on the decompression meter dial.

Patent Application Ser. No. 181,106, filed Sept. 16, 1971, entitled, "Miniaturized Automatic Decompression Meters," in the names of Marcus P. Borom and Lyman A. Johnson, which discloses and claims the combination of a constant-volume gas chamber and a liquid-filled gauge which enables miniaturization without impairing performance of the instrument.

BACKGROUND OF THE INVENTION

The major hazard faced by both commercial and sport divers is decompression sickness which results from the release of dissolved gases from the body tissues as discrete bubbles when the ambient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression Tissue ratio = Safe maximum tissue pressure/ambient pressure with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness," J. Hygiene, 8, 342-443 (1908)] proposed that the body tissues can be considered to be gas-diffusion chambers arranged in a parallel circuit with each chamber having a characteristic tissue half-time and tissue ratio.

On the basis of their model, Boycott, et al proposed a radical departure from the conventional continuous decompression schedules which became known as "stage" decompression. Today their model forms the basis for the modern decompression schedules as set forth in the Standard Navy Decompression Tables. These Tables have been computed using tissue half-times of 20, 40, 80 and 120 minutes and tissue ratios from 2.5/1 to 1.8/1. These Tables are designed for fixed mission dives, that is, dives to a predetermined depth for a predetermined time. Consequently, they are not suitable for the majority of commercial and sport dives since they prescribe a longer-than-necessary decompression schedule as the alternative to hazarding an estimate compensating for depth excursions during a dive.

Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott, et al. model. Thus, because of Poiseuille flow, tissue gas uptake and release actions are not computed according to the expression used in developing the accepted decompression tables. The use of a diffusion membrane provides the precise analogue to these expressions.

SUMMARY OF THE INVENTION

In accordance with this invention, a single gauge serves a number of separate time-constant pressure chambers in a pneumatic analogue computing system such as described and claimed in the above application Ser. No. 181,107, the disclosure of which is incorporated herein by reference. The concept enabling this advance is an automatic switching feature which is disclosed and generically claimed in our patent application (now abandoned) Ser. No. 181,100, filed of even date herewith and entitled, "Automatic Fluid Pressure-Sensing Apparatus," and assigned to the assignee hereof, the disclosure of which is incorporated herein by reference. Also in accordance with this invention, the instruments hereof include tissue-ratio simulation which is integrated into the read-out of the instrument through the function of biasing means located in the time-constant pressure chamber and compensating for tissue-ratio variations between the different time-constant tissues simulated by the instrument.

DESCRIPTION OF THE INVENTION

The illustrated instrument is self-contained and submersible, being constructed of materials which are of requisite physical strength and corrosion-resistance for prolonged use at depth in either sport diving excursions or deeper and prolonged professional diving operations. The device is also of compact or miniaturized form so that it can be conveniently worn on the diver's wrist. The preferred materials of construction are lightweight, transparent plastics such as polymethylmethacrylate plastic. It will be understood, however, that metal parts may be used throughout or in place of one or more of the plastic elements comprising the device.

Two main parts of the illustrated device are body B, which comprises an assembly of several elements, and bourdon tube gauge G which is secured to body B and in communication with internal passages therein, as will be described.

Figure 1:
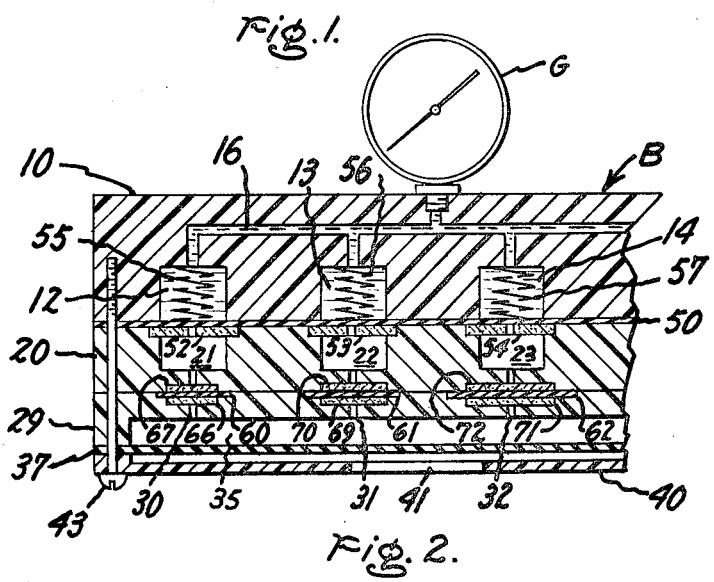
FIG. 1 is a fragmentary, vertical sectional view of an instrument embodying this invention in a preferred form.

Body B comprises an upper manifold block 10 on which gauge G is fluid-tightly mounted and within the lower side of which three chambers 12, 13 and 14 are formed. These chambers communicate with gauge G through manifold passage 16. As indicated in FIG. 1, additional recesses or chambers of this type may be provided and similarly connected by manifold passage 16 so that all the chambers are in communication with each other and with gauge G. Any desired number of such chambers may thus be provided, but as a practical matter for most diving purposes, a three-chamber device will be adequate.

Time-constant chamber block 20 is positioned below block 10 and has time-constant chambers 21, 22 & 23 which open upwardly and are in register with chambers 12, 13 and 14, respectively. A relatively shallow recess is formed in the lower face of block 20 below each time-constant chamber for the purpose to be described and three short passageways are provided so that chambers 21, 22 and 23 each separately communicate with the recess therebelow.

A membrane assembly block 29 is situated below block 20 and has relatively shallow recesses in its upper surface in register with the shallow recesses of block 20. Passages 30, 31 and 32 in block 29 connect each of these recesses to ambient-pressure gas chamber 35 in the lower portion of block 29. Chamber 35 is closed by a rubber bladder or diaphragm 37 so that air or other suitable gas in the chamber will be subjected to compression as the diaphragm is deformed by water pressure of the environment experienced by a diver carrying the instrument.

A cover plate 40 having a central opening 41 is secured by bolts 43 to the instrument, rubber bladder 37 being held firmly in position around its periphery between plate 40 and a downwardly-extending annular flange of block 29.

Between blocks 10 and 20, a diaphragm 50 of elastomeric material, suitably natural rubber, is positioned to fluid-tightly seal chambers 12, 13 and 14, respectively, and close them off from communication with chambers 21, 22 and 23. This diaphragm is supported against motion downward beyond a rest position by porous fritted glass discs 52, 53 and 54, each of which has an axial aperture so that gas pressure in chambers 21, 22 or 23 can be instantly effective to displace liquid contained in recesses 12, 13 or 14 when gas pressure in one of the time-constant chambers is increased.

Coil springs 55, 56 and 57, each of different spring constant from the others are positioned in recesses 12, 13 and 14, respectively, where they resiliently oppose upward displacement of diaphragm 50. The spring constants of these springs are selected with regard to the tissue ratio of the particular human body tissue to which the associated time-constant chamber is related.

Gas-diffusion membranes in the form of thin discs are located between ambient-pressure gas chamber 35 and time-constant gas chambers 21, 22 and 23. These membranes, respectively, 60, 61 and 62, are of silicone rubber or other suitable material as described in copending application RD-3993 - Borom referenced above, and they are disposed in the upper surface of membrane assembly block 29. Membrane 62 is a disc three mils thick, while membrane disc 61 is approximately six mils thick and membrane disc 60 is approximately three times the thickness of membrane 62. Each membrane is supported against gas-pressure differentials developing during normal use of the instrument by porous plates disposed in the opposed shallow recesses of blocks 20 and 29. Thus, in the case of membrane 60, a lower support body 66 is disposed in the recess of the upper face of block 29 while a similar body 67 is situated in and entirely fills the opposed recess in the lower face of block 20. The effective area of membrane 60 is that represented by the surface of support body 67 opposed to membrane disc 60. The support assembly for membrane 61 comprises another pair of lower and upper support bodies 69 and 70, while similar support bodies 71 and 72 serve the same purpose for membrane 62. All these support bodies are alike in that they are gas-permeable, being of porous fritted glass. However, the support bodies are of different diameters because, as shown, the effective area of membrane 61 is larger than that of membrane 60 and that the effective area of membrane 62 is the largest of the three.

Figure 2:
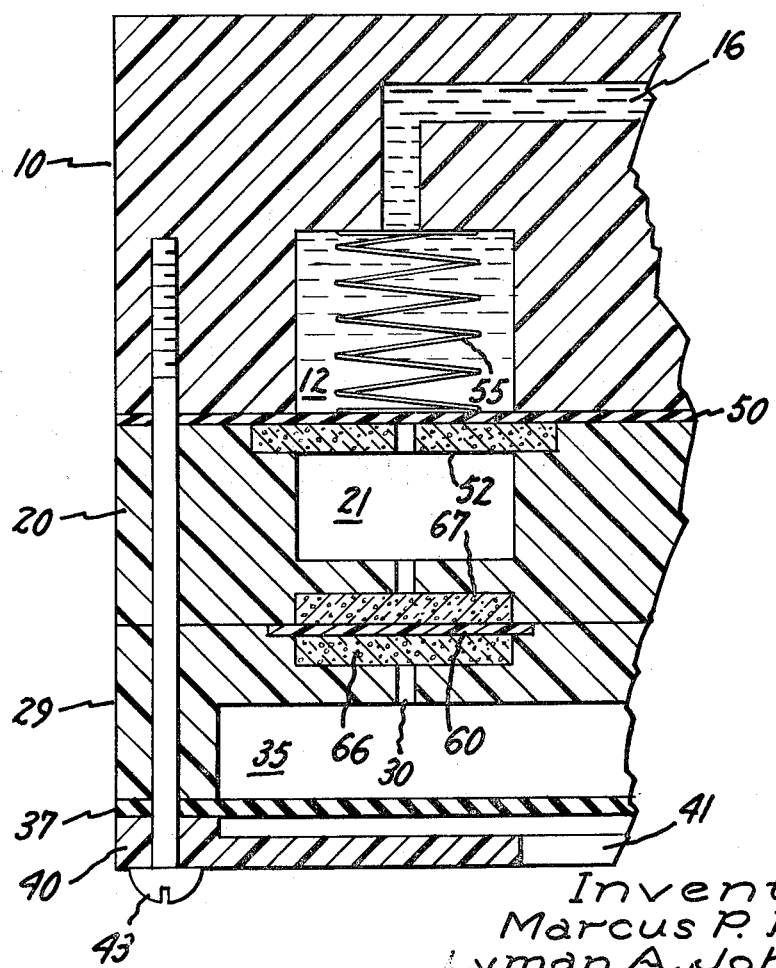
FIG. 2 is an enlarged fragmentary view of a portion of the instrument illustrated in FIG. 1, showing to better advantage the components of the analogue computing means and the functional relationship thereof to other parts of the instrument.

When the illustrated instrument is taken below the surface of the water or into some other hyperbaric environment where it is to simulate body tissues in respect to absorption of breathing gas, the ambient-pressure of the instrument automatically instantly adjusts in response to environmental pressure through the action of diaphragm 37. Thus, in a diving operation, water enters the instrument through opening 41 in cover 40 and exerts pressure against diaphragm 37 which in FIGS. 1 and 2 is shown in its normal or atmospheric pressure position. As diaphragm 37 is deflected under pressure of the water, the effective volume of ambient-pressure chamber 35 is diminished and membranes 60, 61 and 62 are subjected to ambient-pressure air. This increased air pressure on the membranes results in diffusion of air through them at rates dependent upon the thickness of the membranes and their effective areas. Such diffusion results in increased air pressure in chambers 21, 22 and 23, which is related to the volume of air diffused through membranes 60, 61 and 62 per unit time and is different in each of the three chambers. The greatest air pressure in any of these chambers displaces diaphragm 50 and the liquid content of the chamber opposed thereto, resulting in movement of the indicator of gauge G for read-out directly on the calibrated dial of the gauge. Such displacement of diaphragm 50 is resiliently opposed by spring 55 in the case of time-constant chamber 21 so that the movement of the indicator of gauge G is less than it would otherwise be and allowance thus is made for the ability of the human body tissue to withstand an internal over-pressure without nucleating gas bubbles.

On a prolonged deep dive, the normal experience as indicated by the instrument of FIG. 1 will be that the tissue represented by chamber 23 and associated membrane 62 will register first on gauge G. Subsequently, chamber 22 and still later chamber 21 will have such higher gas pressures. As the diver goes through stages of decompression on return to the surface, chamber 23 will be the one registering on gauge G during early stages of the surface return trip.

By filling the recesses 12, 13 and 14 with liquid and filling the manifold 16 and gauge G with liquid, the overall size of the instrument can be considerably reduced from that required for reliable operation on a gas-pressure basis. The switching function, which is the result of using the pressure-responsive means represented by diaphragm 50 in combination with means for supporting the diaphragm at rest position, enables the use of a single gauge to monitor pressure in all the chambers of the manifold system. Since there are no moving parts in addition to the diaphragm and spring elements which move only in compression and decompression, an instrument can be sealed for reliable long-term maintenance-free service with the additional advantage of instantaneous response of the gauge with small pressure changes within the instrument system.

What we claim as new and desire to secure by Letters Patent of the United States is:

1. A decompression instrument which comprises,
    a. a submersible housing;
    b. an ambient-pressure gas chamber in the housing;
    c. pneumatic analogue computing means in the housing comprising,
        1. a plurality of time-constant gas chambers,
        2. a plurality of imperforate gas-diffusion membranes of different thicknesses separately operatively associated with the time-constant gas chambers and the ambient-pressure chamber to measure continuously the uptake and release of gas by a diver's different time-constant tissues during hyperbaric exposure; and,
    d. indicator means including gauge means operatively associated with such computing means for visually indicating the appropriate decompression schedule,
    said gauge means including a liquid-filled gauge manifold serving the pressure ports, pressure-responsive means fluid-tightly separating the time-constant gas chambers from the gauge manifold and being relatively movable in response to gas pressure changes in the time-constant gas chambers, rigid support means disposed for contact with the pressure-responsive means to limit relative motion of the pressure-responsive means, and a pressure gauge operatively associated with the gauge manifold whereby the indicator means is actuated only by the highest gas pressure prevailing in the time-constant gas chambers.

2. The instrument of claim 1 in which the pressure gauge is a bourdon tube which is liquid-filled and communicates with the gauge manifold.

3. The instrument of claim 1 in which the pressure-responsive means comprises a diaphragm of elastomeric material.

4. The instrument of claim 1 in which the pressure-responsive means is a sheet of rubber-like material which is impervious to fluids in the time-constant gas chambers and in the gauge manifold.

5. The instrument of claim 1 including tissue ratio-simulating biasing means resiliently opposing relative motion of the pressure-responsive means as gas pressure in the time-constant gas chambers is increased.

6. The instrument of claim 5 in which the coil biasing means comprises a separate spring in each time-constant gas chamber and each spring is of different spring constant from the others of the instrument.

7. The instrument of claim 1 in which the submersible housing has a transparent portion and in which the indicator means is positioned in the housing so that the dial is visible through the transparent portion of the housing.

* * * * *